(12) United States Patent
Nakagomi et al.

(10) Patent No.: US 9,872,370 B2
(45) Date of Patent: Jan. 16, 2018

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Yoichi Nakagomi, Matsumoto (JP); Junichi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/355,960

(22) Filed: Nov. 18, 2016

(65) Prior Publication Data
US 2017/0071052 A1 Mar. 9, 2017

Related U.S. Application Data

(63) Continuation of application No. 14/503,853, filed on Oct. 1, 2014, now Pat. No. 9,532,439.

(30) Foreign Application Priority Data

Oct. 11, 2013 (JP) .................................. 2013-213473

(51) Int. Cl.
*H05B 37/02* (2006.01)
*H05B 41/392* (2006.01)
(Continued)

(52) U.S. Cl.
CPC ....... *H05B 41/3927* (2013.01); *H04N 9/3155* (2013.01); *H05B 41/16* (2013.01);
(Continued)

(58) Field of Classification Search
CPC .............................. H05B 41/16; H05B 41/382
(Continued)

(56) References Cited

U.S. PATENT DOCUMENTS 6,788,009 B2 * 9/2004 Fujii .................. H05B 41/2928
315/224
6,867,556 B2 3/2005 Arimoto et al.
(Continued)

FOREIGN PATENT DOCUMENTS

JP 2003-223997 A 8/2003
JP 2004-134162 A 4/2004
(Continued)

*Primary Examiner* — Thuy Vinh Tran
(74) *Attorney, Agent, or Firm* — Oliff PLC

(57) ABSTRACT

A discharge lamp driving device includes: a discharge lamp driving unit which supplies drive power to a discharge lamp; and a control unit which controls the discharge lamp driving unit according to a waveform of the drive power. The waveform has n launching periods and a low-power mode lighting period. The n launching periods include a first launching period in which the drive power increases toward refresh power that is equal to or above drive power in a low-power mode and equal to or below rated power, and (n−1) launching periods in which the drive power is maintained at the refresh power. The control unit, in an x-th launching period, supplies the discharge lamp with a drive current having a drive frequency equal to or below a drive frequency of a drive current supplied to the discharge lamp in an (x−1)th launching period.

17 Claims, 7 Drawing Sheets

(51) Int. Cl.
*H04N 9/31* (2006.01)
*H05B 41/16* (2006.01)
*H05B 41/38* (2006.01)

(52) U.S. Cl.
CPC ........... *H05B 41/382* (2013.01); *H04N 9/312* (2013.01); *H04N 9/3167* (2013.01); *H04N 9/3197* (2013.01)

(58) Field of Classification Search
USPC .................................................. 315/291, 307
See application file for complete search history.

(56) References Cited

U.S. PATENT DOCUMENTS

| | | | |
|---|---|---|---|
| 6,958,580 | B2 | 10/2005 | Kamoi et al. |
| 6,979,960 | B2 | 12/2005 | Okawa et al. |
| 7,439,691 | B2 | 10/2008 | Sugaya et al. |
| 7,474,064 | B2 | 1/2009 | Lai et al. |
| 7,508,144 | B2 | 3/2009 | Yamauchi et al. |
| 7,946,715 | B2 | 5/2011 | Yamauchi et al. |
| 8,018,178 | B2 | 9/2011 | Yamauchi |
| 8,269,426 | B2 | 9/2012 | Yamauchi |
| 8,314,570 | B2 * | 11/2012 | Tsukamoto ........ H05B 41/2882 315/224 |
| 8,598,801 | B2 * | 12/2013 | Yamashita ......... H05B 41/2883 315/209 R |
| 2004/0075392 | A1 | 4/2004 | Arimoto et al. |
| 2004/0136134 | A1 | 7/2004 | Okawa et al. |
| 2004/0183473 | A1 | 9/2004 | Kamoi et al. |
| 2007/0262729 | A1 | 11/2007 | Sugaya et al. |
| 2008/0231816 | A1 | 9/2008 | Tanaka |
| 2009/0085495 | A1 | 4/2009 | Yamauchi et al. |
| 2010/0244716 | A1 | 9/2010 | Yamahara et al. |

FOREIGN PATENT DOCUMENTS

| | | |
|---|---|---|
| JP | 2008-041588 A | 2/2008 |
| JP | 2008-235199 A | 10/2008 |
| JP | 2008-270058 A | 11/2008 |
| JP | 2009-212069 A | 9/2009 |
| JP | 4400125 B2 | 1/2010 |
| JP | 2010-113822 A | 5/2010 |
| JP | 2010-198785 A | 9/2010 |
| JP | 4972992 B2 | 7/2012 |

* cited by examiner

DISCHARGE LAMP DRIVING DEVICE, PROJECTOR, AND DISCHARGE LAMP DRIVING METHOD

CROSS-REFERENCE TO RELATED APPLICATIONS

This application is a continuation of U.S. patent application Ser. No. 14/503,853, filed Oct. 1, 2014, now U.S. Pat. No. 9,532,439 issued on Dec. 27, 2016, which claims the benefit of priority of the Japanese Patent Application No. 2013-213473 filed on Oct. 11, 2013. The disclosures of the prior applications are hereby incorporated by reference herein in their entirety.

BACKGROUND

1. Technical Field

The present invention relates to a discharge lamp driving device, a light source, a projector, and a discharge lamp driving method.

2. Related Art

Recently, energy savings are desired in projectors. Therefore, projectors equipped with various lighting modes are provided, such as a low-power mode in which drive power to the lamp is lower than usual, a dimming mode in which drive power is changed synchronously with video signals, and a standby mode in which drive power is lowered when video signals are not inputted from outside. For example, in the low-power mode, since lower drive power is supplied to the lamp, the load on the electrodes is lower, thus increasing the service life of the lamp.

However, if drive power is lower than rated power, the protrusions at the distal ends of the electrodes cannot be melted sufficiently. As the lighting is continued for a long time, the protrusions get worn and reduced. The reduction of the protrusions means the expansion of the distance between the electrodes, causing a fall in illuminance. That is, if the shape of the protrusions at the distal ends of the electrodes cannot be maintained, the advantages of the low-power mode cannot be achieved and a problem of shorter service life of the lamp arises. Thus, in order to overcome this problem, a discharge lamp lighting device and a projector in which the lamp is driven in a refresh lighting mode to promote the melting of the protrusions of the electrodes during a predetermined period after the lighting of the lamp are proposed (see JP-A-2008-270058).

In the projector of JP-A-2008-270058, lamp power above the rated power value is supplied in the refresh lighting mode. In this case, it is anticipated that the protrusions formed in normal lighting are melted excessively and cannot be maintained in shape. Consequently, the lamp flickers as the lamp cannot maintain stable discharge. Also, a high load is on the arc tube and may cause inconvenience such as crystallization of the quartz glass or so-called, devitrification.

SUMMARY

An advantage of some aspects of the invention is to provide a discharge lamp driving device, a light source, a projector and a discharge lamp driving method that can maintain stable discharge are provided.

An aspect of the invention is directed to a discharge lamp driving device including: a discharge lamp driving unit which supplies drive power to a discharge lamp; and a control unit which controls the discharge lamp driving unit according to a waveform of the drive power. The waveform has n (n being a natural number equal to or above 2) launching periods and a low-power mode lighting period. The n launching periods include a first launching period in which the drive power increases toward refresh power that is equal to or above low-power mode power and equal to or below rated power, and (n−1) launching periods in which the drive power is maintained at the refresh power. The control unit, in an x-th (x being a natural number equal to or above 2 and equal to or below n) launching period, supplies the discharge lamp with a drive current having a drive frequency equal to or below a drive frequency of a drive current supplied to the discharge lamp in an (x−1)th launching period. The control unit adjusts at least the drive frequency that is a part of the drive frequencies in the plural launching periods according to a degree of deterioration of the discharge lamp.

The discharge lamp driving device according to this aspect of the invention has a low-power mode in which the discharge lamp is driven with the low-power mode power that is lower than the rated power of the discharge lamp. The protrusions at the distal ends of the electrodes of the discharge lamp, when driven in the low-power mode, are narrower than when driven with the rated power of the discharge lamp. Therefore, if driving with high melting capability immediately after the discharge lamp is lit, the shape of the protrusions may collapse. In contrast, in the discharge lamp driving device according to this aspect of the invention, in the launching period following the first launching period in which the drive power increases toward the refresh power that is equal to or above the low-power mode power and equal to or below the rated power, the drive frequency is maintained or the drive frequency gradually falls. In this case, since the protrusion melting effect gradually increases with the lapse of the launching period, the protrusions can be melted properly while the shape of the protrusions is maintained.

In the discharge lamp driving device according to this aspect of the invention, at least the drive frequency that is a part of the plural drive frequencies corresponding to the plural launching periods is adjusted according to the degree of deterioration of the discharge lamp. Therefore, even if the degree of deterioration of the discharge lamp changes, the melting state of the protrusions at the distal ends of the electrodes can be stably controlled according to the degree of deterioration. Consequently, stable discharge is achieved. Therefore, change in illuminance of the discharge lamp can be restrained and a long service life of the discharge lamp can be maintained.

In the discharge lamp driving device according to the aspect of the invention, the drive current in the n launching periods may intermittently include a second waveform pattern having a higher load on the discharge lamp than in a first waveform pattern that is a basic waveform pattern of the drive current supplied to the discharge lamp in each launching period.

According to this configuration, as the second waveform pattern with a higher load on the discharge lamp is intermittently inserted in the first waveform pattern that is the basic waveform pattern, the protrusion melting effect can be effectively enhanced.

In the discharge lamp driving device according to the aspect of the invention, the control unit may adjust at least one of an insertion time of the second waveform pattern, an insertion interval of the second waveform pattern, a number of times of insertion of the second waveform pattern, and a configuration of the second waveform pattern, according to the degree of deterioration of the discharge lamp.

Although the second waveform pattern contributes to the enhancement of the protrusion melting effect, excessive insertion of the second waveform pattern causes excessive melting of the protrusions and an inability to maintain the shape of the protrusions. In this regard, according to the above configuration, since the insertion time, the insertion interval, the number of times of insertion, the configuration or the like of the second waveform pattern is adjusted according to the degree of deterioration of the discharge lamp, excessive melting of the protrusions does not occur and the good shape of the protrusions can be maintained.

In the discharge lamp driving device according to the aspect of the invention, the second waveform pattern may include a drive current pattern having a drive frequency equal to or below 500 Hz or a drive current pattern combining DC driving and AC driving.

By thus employing AC driving with a relatively low frequency or driving including a DC component, a high melting effect can be realized.

In the discharge lamp driving device according to the aspect of the invention, the control unit may be configured to detect the degree of deterioration of the discharge lamp by referring to an inter-electrode voltage of the discharge lamp in the low-power mode.

As the protrusions at the distal ends of the electrodes of the discharge lamp are worn and reduced, the distance between the electrodes expands and the inter-electrode voltage increases accordingly. Therefore, according to this configuration, the degree of deterioration of the discharge lamp can be directly grasped by referring to the inter-electrode voltage of the discharge lamp, and an optimum drive frequency can be set.

In the discharge lamp driving device according to the aspect of the invention, the control unit may be configured to refer to the inter-electrode voltage at an arbitrary time point in the first launching period and estimate the inter-electrode voltage in the low-power mode on the basis of the result of the reference to the inter-electrode voltage.

According to this configuration, the inter-electrode voltage in the first launching period is referred to, every time the lamp is lit. Therefore, the inter-electrode voltage in the low-power mode can be estimated accurately and the degree of deterioration of the discharge lamp can be detected appropriately.

In the discharge lamp driving device according to the aspect of the invention, the control unit may be configured to read out the inter-electrode voltage referred to and stored at the time of previous lighting of the discharge lamp, at the time of next lighting of the discharge lamp, and estimate the inter-electrode voltage in the low-power mode on the basis of the result of the reading of the inter-electrode voltage.

According to this configuration, the inter-electrode voltage that is already stored at the time of previous lighting is referred to at the time of next lighting. Therefore, the inter-electrode voltage in the low-power mode can be easily estimated and the degree of deterioration of the discharge lamp can be detected appropriately.

In the discharge lamp driving device according to the aspect of the invention, the drive frequency in the first launching period may be equal to or above 500 Hz.

According to this configuration, excessive melting of the protrusions of the electrodes does not occur and unwanted evaporation of the electrode material can be prevented.

Another aspect of the invention is directed to a light source including: a discharge lamp which emits light; and the discharge lamp driving device according to the aspect of the invention described above.

According to this aspect, a light source that can achieve stable illuminance and a long service life of the discharge lamp can be realized.

Still another aspect of the invention is directed to a projector including: the light source according to the aspect of the invention described above; a light modulation element which modulates light emitted from the light source, according to a video signal; and a projection system which projects the light modulated by the light modulation element, onto a projection target surface.

According to this aspect, a projector with excellent display definition and high reliability can be realized.

Yet another aspect of the invention is directed to a discharge lamp driving method in which a discharge lamp is driven according to a waveform of drive power having n (n being a natural number equal to or above 2) launching periods and a low-power mode lighting period. The n launching periods include a first launching period in which the drive power increases toward refresh power that is equal to or above low-power mode power and equal to or below rated power, and (n−1) launching periods in which the drive power is maintained at the refresh power. The method includes: in an x-th (x being a natural number equal to or above 2 and equal to or below n) launching period, supplying the discharge lamp with a drive current having a drive frequency equal to or below a drive frequency of a drive current supplied to the discharge lamp in an (x−1)th launching period; and adjusting at least the drive frequency that is a part of the drive frequencies in the plural launching periods according to a degree of deterioration of the discharge lamp.

According to the discharge lamp driving method of this aspect, stable discharge is achieved. Therefore, change in illuminance of the discharge lamp can be restrained and a long service life of the discharge lamp can be maintained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
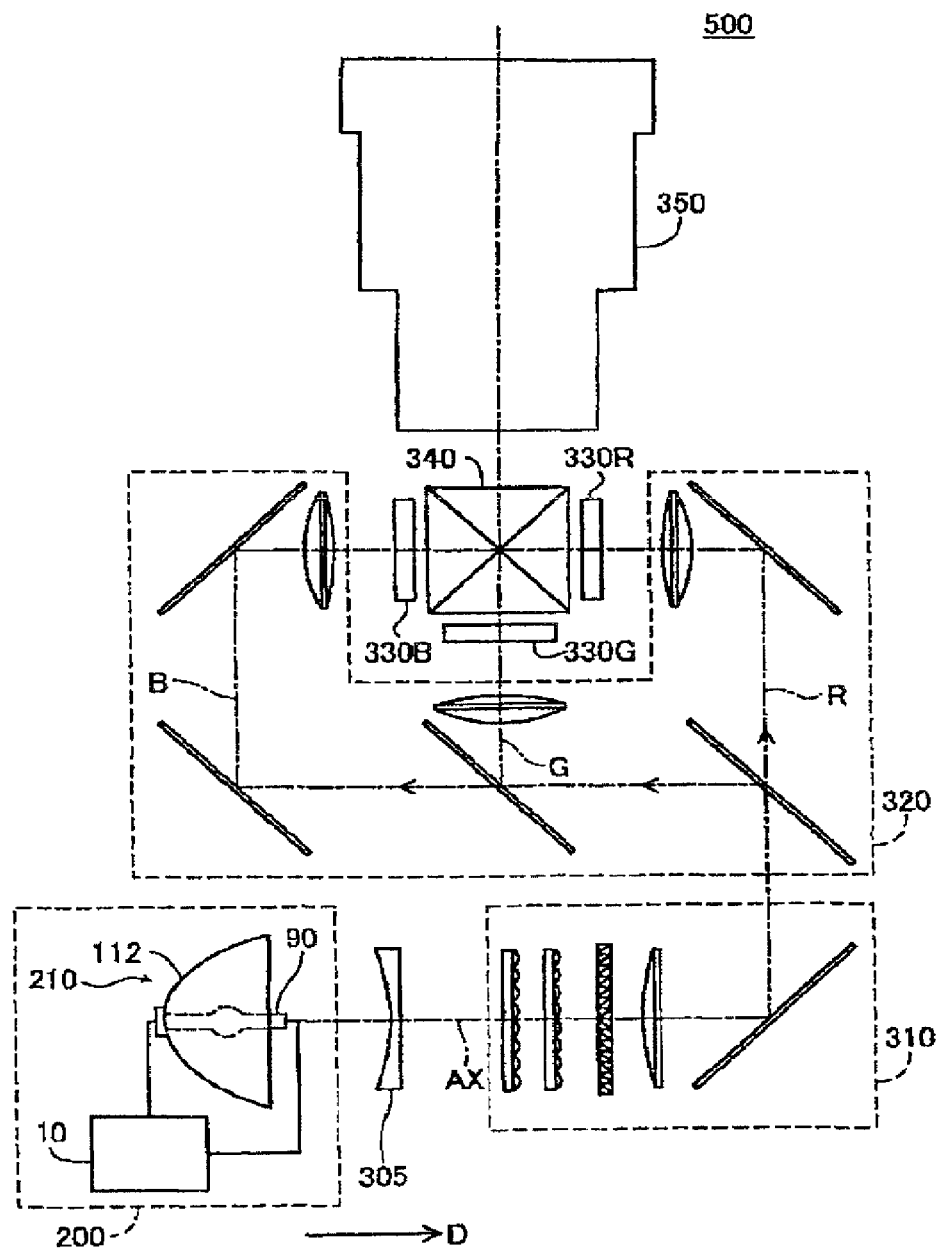
FIG. 1 shows the schematic configuration of a projector according to an embodiment of the invention.

Hereinafter, a projector according to an embodiment of the invention will be described with reference to the drawings.

It should be noted that the scope of the invention is not limited to the embodiments below and that arbitrary changes can be made within the technical ideas of the invention. Also, in the drawings, the scale, number and the like of each structure may appear different from the actual structure, in order to facilitate understanding of each configuration.

As shown in FIG. 1, a projector 500 according to this embodiment includes a light source 200, a parallelizing lens 305, an illumination system 310, a color separation system 320, three liquid crystal light valves 330R, 330G, 330B (light modulation elements), a cross dichroic prism 340, and a projection system 350.

The light emitted from the light source 200 passes through the parallelizing lens 305 and becomes incident on the illumination system 310. The parallelizing lens 305 has the function of parallelizing the light from the light source 200.

The illumination system 310 has the function of adjusting the illuminance of the light emitted from the light source 200 so that the illuminance becomes uniform on the liquid crystal light valves 330R, 330G, 330B. The illumination system 310 also has the function of aligning the polarizing direction of the light emitted from the light source 200 into one direction. The reason for this is to allow the light emitted from the light source 200 to be effectively utilized on the liquid crystal light valves 330R, 330G, 330B.

The light with the illuminance distribution and polarizing direction thus adjusted becomes incident on the color separation system 320. The color separation system 320 separates the incident light into three color lights of red light (R), green light (G), and blue light (B). The three color lights are modulated by the liquid crystal light valves 330R, 330G, 330B corresponding to the respective color lights. The liquid crystal light valves 330R, 330G, 330B have liquid crystal panels 560R, 560G, 560B, described later, and polarizers (not shown). The polarizers are arranged on the light incident side and light exiting side of each of the liquid crystal panels 560R, 560G, 560B.

The modulated three color lights are combined by the cross dichroic prism 340. The combined light becomes incident on the projection system 350. The projection system 350 projects the incident light onto a screen 700 (see FIG. 3). Thus, a video is displayed on the screen 700. Known configurations can be employed for each of the parallelizing lens 305, the illumination system 310, the color separation system 320, the cross dichroic prism 340 and the projection system 350.

Figure 2:
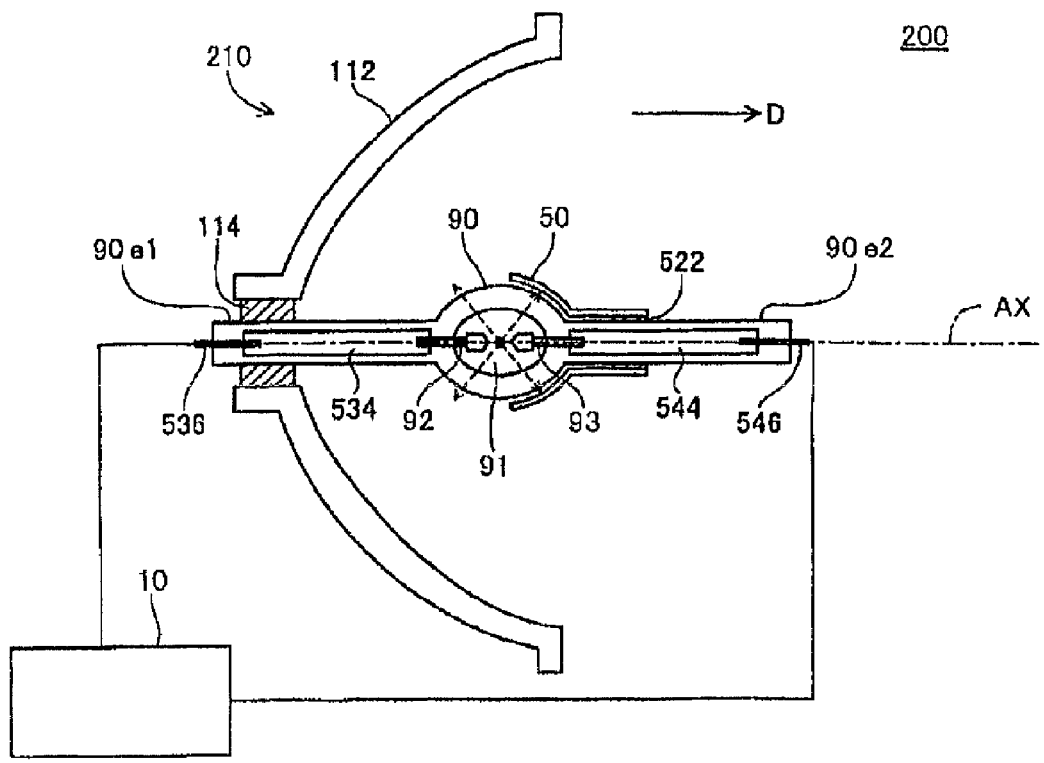
FIG. 2 is a cross-sectional view showing a discharge lamp of the embodiment.

FIG. 2 is a cross-sectional view showing the configuration of the light source 200. The light source 200 includes a light source unit 210, and a discharge lamp lighting device (discharge lamp driving device) 10. FIG. 2 shows a cross-sectional view of the light source unit 210. The light source unit 210 has a main reflection mirror 112, a discharge lamp 90, and a sub reflection mirror 50.

The discharge lamp lighting device 10 supplies drive power (drive current) to the discharge lamp 90 and thus lights the discharge lamp 90. The main reflection mirror 112 reflects the light radiated from the discharge lamp 90 into an irradiating direction D. The irradiating direction D is parallel to an optical axis AX of the discharge lamp 90.

The shape of the discharge lamp 90 is a bar-shape extending along the irradiating direction D. One end of the discharge lamp 90 is defined as a first end 90e1. The other end of the discharge lamp 90 is defined as a second end 90e2. The material of the discharge lamp 90 is, for example, a light-transmissive material such as quartz glass. A center part of the discharge lamp 90 is expanded in a spherical shape and the inside thereof is a discharge space 91. In the discharge space 91, a gas that is a discharge medium containing a rare gas, metal halogen compound or the like is enclosed.

In the discharge space 91, distal ends of a first electrode 92 and a second electrode 93 are protruding. The first electrode 92 is arranged on the side of the first end 90e1 of the discharge space 91. The second electrode 93 is arranged on the side of the second end 90e2 in the discharge space 91. The shape of the first electrode 92 and the second electrode 93 is a bar-shape extending along the optical axis AX. In the discharge space 91, the electrode distal ends of the first electrode 92 and the second electrode 93 are arranged facing each other at a predetermined distance from each other. The material of the first electrode 92 and the second electrode 93 is, for example, a metal such as tungsten.

A first terminal 536 is provided at the first end 90e1 of the discharge lamp 90. The first terminal 536 and the first electrode 92 are electrically connected to each other by a conductive member 534 penetrating the inside of the discharge lamp 90. Similarly, a second terminal 546 is provided at the second end 90e2 of the discharge lamp 90. The second terminal 546 and the second electrode 93 are electrically connected to each other by a conductive member 544 penetrating the inside of the discharge lamp 90. The material of the first terminal 536 and the second terminal 546 is, for example, a metal such as tungsten. As the material of the conductive members 534, 544, for example, a molybdenum foils is used.

The first terminal 536 and the second terminal 546 are connected to the discharge lamp lighting device 10. The discharge lamp lighting device 10 supplies drive power for driving the discharge lamp 90, to the first terminal 536 and the second terminal 546. Consequently, arc discharge occurs between the first electrode 92 and the second electrode 93. The light (discharge light) generated by the arc discharge is radiated in all directions from the discharge position, as indicated by dashed line arrows.

The main reflection mirror 112 is fixed to the first end 90e1 of the discharge lamp 90 by a fixing member 114. The main reflection mirror 112 reflects the light that travels opposite to the irradiating direction D, of the discharge light, into the irradiating direction D. The shape of the reflection surface (surface on the side of the discharge lamp 90) of the main reflection mirror 112 is not particularly limited as long as it is within a range in which the mirror can reflect the discharge light into the irradiating direction D. The shape of the reflection surface may be, for example, a rotating elliptic shape or a rotating parabolic shape. For example, if the shape of the reflection surface of the main reflection mirror 112 is a rotating parabolic shape, the main reflection mirror 112 can convert the discharge light into light that is substantially parallel to the optical axis AX. This enables omission of the parallelizing lens 305.

The sub reflection mirror 50 is fixed on the side of the second end 90e2 of the discharge lamp 90 by a fixing member 522. The shape of the reflection surface (surface on the side of the discharge lamp 90) of the sub reflection mirror 50 is a spherical shape surrounding the portion on the side of the second end 90e2, of the discharge space 91. The sub reflection mirror 50 reflects the light that travels opposite to the side where the main reflection mirror 112 is arranged, of the discharge light, toward the main reflection mirror 112. Thus, the utilization efficiency of the light radiated from the discharge space 91 can be enhanced.

The material of the fixing members 114, 522 is not particularly limited as long as it is within a range of heat-resistant material that can resist heat generation from the discharge lamp 90. For example, an inorganic adhesive may be used. The method for fixing the arrangement of the main reflection mirror 112 and the sub reflection mirror 50 in relation to the discharge lamp 90 is not limited to the method in which the main reflection mirror 112 and the sub reflection mirror 50 are fixed to the discharge lamp 90, and an arbitrary method can be employed. For example, the discharge lamp 90 and the main reflection mirror 112 may be separately fixed to a casing (not shown) of the projector. The same can be applied to the sub reflection mirror 50.

Hereinafter, the circuit configuration of the projector 500 will be described.

Figure 3:
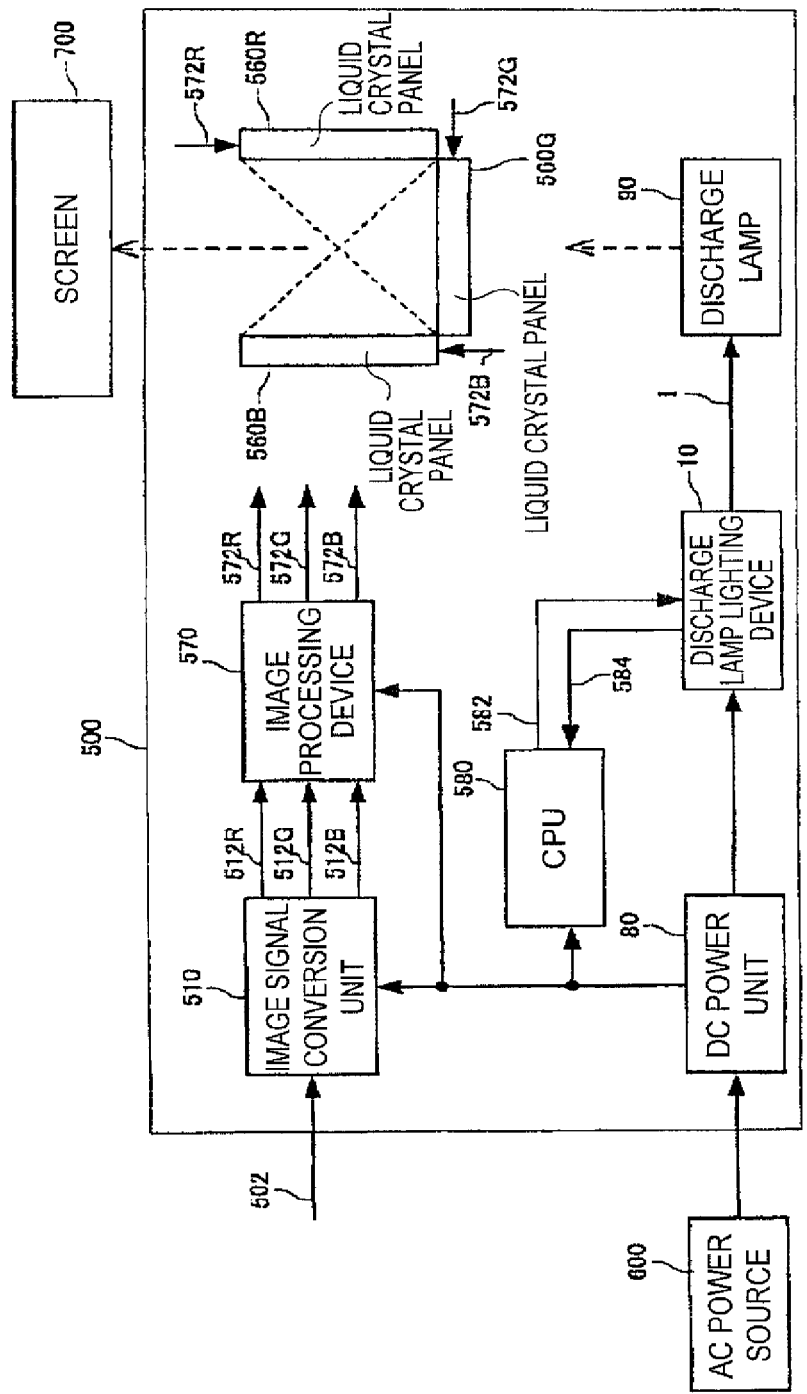
FIG. 3 is a block diagram showing various components of the projector of the embodiment.

FIG. 3 shows an example of the circuit configuration of the projector 500 of this embodiment. The projector 500 includes an image signal conversion unit 510, a DC power unit 80, the liquid crystal panels 560R, 560G, 560B, an image processing device 570, and a CPU (central processing unit) 580, in addition to the optical system shown in FIG. 1.

The image signal conversion unit 510 converts an image signal 502 inputted from outside (such as luminance and color difference signals or analog RGB signals) to a digital RGB signal with a predetermined word length, thus generates image signals 512R, 512G, 512B and supplies the image signals to the image processing device 570.

The image processing device 570 carries out image processing on each of the three image signals 512R, 512G, 512B. The image processing device 570 supplies drive signals 572R, 572G, 572B for driving the liquid crystal panels 560R, 560G, 560B, respectively, to the liquid crystal panels 560R, 560G, 560B.

The DC power unit 80 converts an AC voltage supplied from an external AC power source 600 into a predetermined DC voltage. The DC power unit 80 supplies the DC voltage to the image signal conversion unit 510 and the image processing device 570 on the secondary side of a transformer (not shown but included in the DC power unit 80) and to the discharge lamp lighting device 10 on the primary side of the transformer.

The discharge lamp lighting device 10, on startup, generates a high inter-electrode voltage of the discharge lamp 90 and thus causes insulation breakdown to form a discharge path. Subsequently, the discharge lamp lighting device 10 supplies a drive current I for the discharge lamp 90 to maintain discharge.

The liquid crystal panels 560R, 560G, 560B are provided in the liquid crystal light valves 330R, 330G, 330B, respectively. The liquid crystal panels 560R, 560G, 560B modulate the transmittance (luminance) of the color lights incident on the respective liquid crystal panels 560R, 560G, 560B via the foregoing optical system, based on the respective drive signals 572R, 572G, 572B.

The CPU 580 controls various operations from the start of lighting of the projector 500 to turning off of the lighting. For example, in the example of FIG. 3, the CPU 580 outputs a lighting command or turning-off command to the discharge lamp lighting device 10 via a communication signal 582. The CPU 580 receives lighting information from the discharge lamp lighting device 10 via a communication signal 584.

Hereinafter, the configuration of the discharge lamp lighting device 10 will be described.

Figure 4:
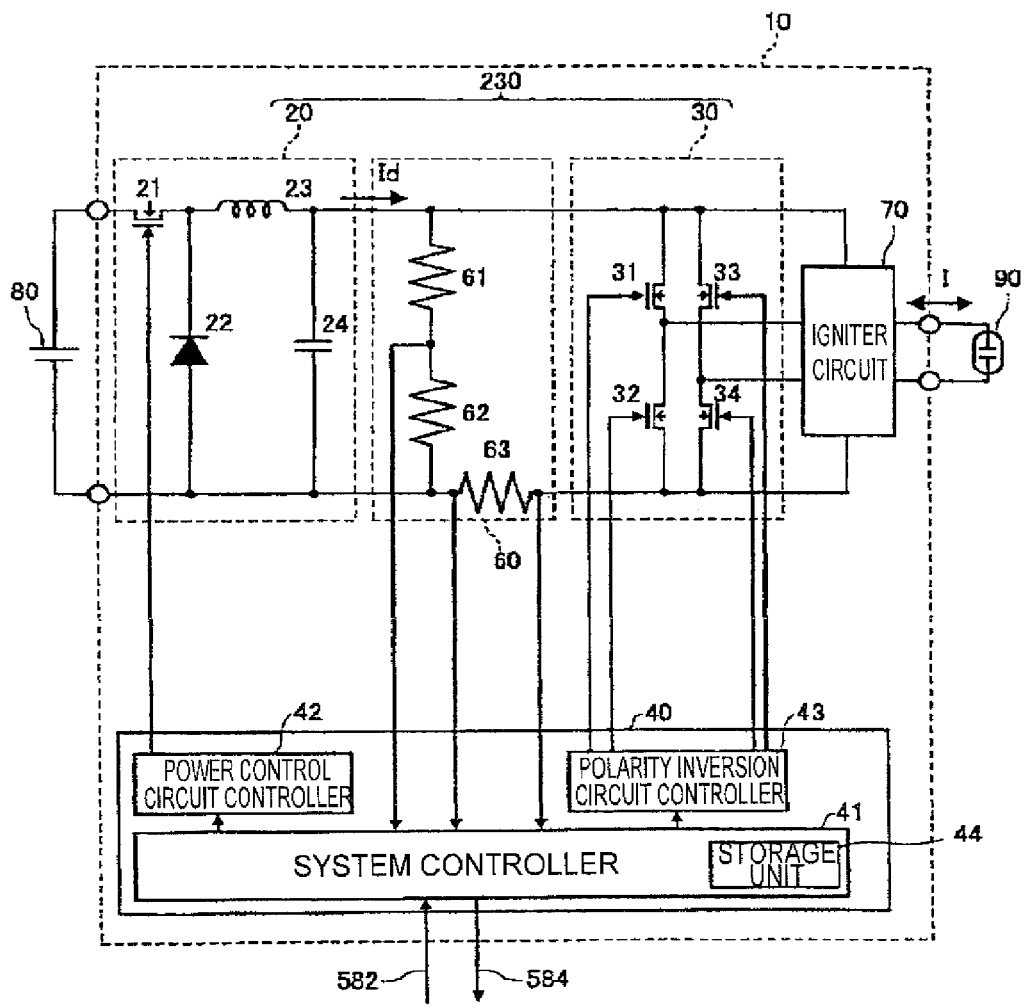
FIG. 4 is a circuit diagram showing a discharge lamp lighting device of the embodiment.

FIG. 4 shows an example of the circuit configuration of the discharge lamp lighting device 10.

As shown in FIG. 4, the discharge lamp lighting device 10 has a power control circuit 20, a polarity inversion circuit 30, a control unit 40, an operation detection unit 60, and an igniter circuit 70.

The power control circuit 20 generates drive power to be supplied to the discharge lamp 90. In this embodiment, the power control circuit 20 is made up of a step-down chopper circuit which takes the voltage from the DC power unit 80 as an input, lowers the input voltage and outputs a DC current Id.

The power control circuit 20 includes a switch element 21, a diode 22, a coil 23, and a capacitor 24. The switch element 21 is made up of, for example, a transistor. In this embodiment, one end of the switch element 21 is connected to the positive voltage side of the DC power unit 80, and the other end is connected to the cathode terminal of the diode 22 and one end of the coil 23.

One end of the capacitor 24 is connected to the other end of the coil 23, and the other end of the capacitor 24 is connected to the anode terminal of the diode 22 and the negative voltage side of the DC power unit 80. A current control signal from the control unit 40, later described, is inputted to the control terminal of the switch element 21 and the switch element 21 is thus on/off-controlled. As the current control signal, for example, a PWM (pulse width modulation) control signal may be used.

As the switch element 21 is switched on, a current flows through the coil 23 and energy is accumulated in the coil 23. As the switch element 21 is subsequently switched off, the energy accumulated in the coil 23 is discharged through a route passing through the capacitor 24 and the diode 22. Consequently, a DC current Id corresponding to the proportion of the time when the switch element 21 is on is generated.

The polarity inversion circuit 30 inverts the polarity of the DC current Id inputted from the power control circuit 20, at predetermined timing. Thus, the polarity inversion circuit 30 generates and outputs a drive current I that is a direct current continuing for a controlled time, or a drive current I that is an alternating current with an arbitrary frequency. In this embodiment, the polarity inversion circuit 30 is made up of an inverter bridge circuit (full bridge circuit).

The polarity inversion circuit 30 includes a first switch element 31, a second switch element 32, a third switch element 33, and a fourth switch element 34 which are made up of, for example, transistors or the like. The polarity inversion circuit 30 is configured in such a way that the first switch element 31 and the second switch element 32, connected in series, and the third switch element 33 and the fourth switch element 34, connected in series, are connected in parallel. A polarity inversion control signal is inputted to each of the control terminals of the first switch element 31, the second switch element 32, the third switch element 33 and the fourth switch element 34 from the control unit 40. Based on the polarity inversion control signal, the on/off operation of the first switch element 31, the second switch element 32, the third switch element 33 and the fourth switch element 34 is controlled.

In the polarity inversion circuit 30, an operation to alternately switch on and off the first switch element 31 and the fourth switch element 34 on one hand and the second switch element 32 and the third switch element 33 on the other is repeated. Thus, the polarity of the DC current Id outputted from the power control circuit 20 is alternately inverted. A drive current I that is a direct current maintaining the same polarity state for a controlled time, or a drive current I that is an alternating current with a controlled frequency, is generated and outputted from the common connection point between the first switch element 31 and the second switch element 32 and the common connection point between the third switch element 33 and the fourth switch element 34.

That is, the polarity inversion circuit 30 is controlled in such a way that when the first switch element 31 and the fourth switch element 34 are on, the second switch element 32 and the third switch element 33 are off, whereas when the first switch element 31 and the fourth switch element 34 are off, the second switch element 32 and the third switch element 33 are on. Therefore, when the first switch element 31 and the fourth switch element 34 are on, a drive current I flowing from one end of the capacitor 24 in the order of the first switch element 31, the discharge lamp 90 and the fourth switch element 34 is generated. When the second switch element 32 and the third switch element 33 are on, a drive current I flowing from one end of the capacitor 24 in the order of the third switch element 33, the discharge lamp 90 and the second switch element 32 is generated.

In this embodiment, a section made up of the power control circuit 20 and the polarity inversion circuit 30 is equivalent to a discharge lamp driving unit 230. That is, the discharge lamp driving unit 230 supplies the drive current I (drive power) for driving the discharge lamp 90, to the discharge lamp 90.

The control unit 40 controls the discharge lamp driving unit 230. In the example of FIG. 4, the control unit 40 controls the power control circuit 20 and the polarity inversion circuit 30 and thereby controls parameters such as the duration for which the drive current I maintains the same polarity, the current value of the drive current I (power value of drive power), and the frequency thereof. The control unit performs polarity inversion control on the polarity inversion circuit 30 so as to control the duration for which the drive current I maintains the same polarity, the frequency of the drive current I or the like, using the polarity inversion timing of the drive current I. The control unit 40 performs current control on the power control circuit 20 so as to control the current value of the DC current Id to be outputted.

The configuration of the control unit 40 is not particularly limited. In this embodiment, the control unit 40 includes a system controller 41, a power control circuit controller 42, and a polarity inversion circuit controller 43. The control unit 40 may be partly or entirely made up of a semiconductor integrated circuit.

The system controller 41 controls the power control circuit controller 42 and the polarity inversion circuit controller 43 and thereby controls the power control circuit and the polarity inversion circuit 30. The system controller 41 may control the power control circuit controller 42 and the polarity inversion circuit controller 43, based on a lamp voltage V1a detected by the operation detection unit 60 and the drive current I.

In this embodiment, the system controller 41 may include a storage unit 44. The storage unit 44 may be provided separately from the system controller 41.

The system controller 41 may control the power control circuit 20 and the polarity inversion circuit 30, based on information stored in the storage unit 44. In the storage unit 44, for example, information about drive parameters may be stored, such as the duration for which the drive current I maintains the same polarity, and the current value, frequency, waveform, modulation pattern or the like of the drive current I.

The power control circuit controller 42 outputs a current control signal to the power control circuit 20, based on a control signal from the system controller 41, and thereby controls the power control circuit 20.

The polarity inversion circuit controller 43 outputs a polarity inversion control signal to the polarity inversion circuit 30, based on a control signal from the system controller 41, and thereby controls the polarity inversion circuit 30.

The control unit 40 can be realized by using a dedicated circuit and can be configured to perform the above controls and various controls of processing, described later. Meanwhile, the control unit 40 can also be configured to function as a computer and perform the various controls of processing, for example, by causing the CPU to execute a control program stored in the storage unit 44.

Figure 5:
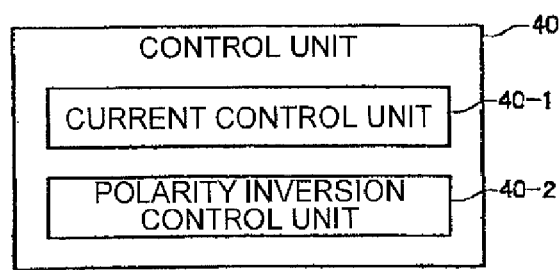
FIG. 5 is a block diagram showing an example of configuration of a control unit of the embodiment.

FIG. 5 illustrates another example of the configuration of the control unit 40. As shown in FIG. 5, the control unit 40 may be configured to function as a current control unit 40-1 which controls the power control circuit 20 and as a polarity inversion control unit 40-2 which controls the polarity inversion circuit 30, based on the control program.

In the example shown in FIG. 4, the control unit 40 is configured as a part of the discharge lamp lighting device 10. Meanwhile, the CPU 580 may be configured to take charge of a part of the functions of the control unit 40.

The operation detection unit 60 may include, for example, a voltage detection unit which detects the lamp voltage of the discharge lamp 90 and outputs lamp voltage information to the control unit 40, a current detection unit which detects the drive current I and outputs drive current information to the control unit 40, and the like. In this embodiment, the operation detection unit 60 includes a first resistor 61, a second resistor 62, and a third resistor 63. The lamp voltage of the discharge lamp 90 means the inter-electrode voltage of the discharge lamp 90.

In this embodiment, the voltage detection unit detects the lamp voltage V1a based on the voltage divided by the first resistor 61 and the second resistor 62, which are connected in parallel with the discharge lamp 90 and connected in series with each other. In this embodiment, the current detection unit detects the drive current I based on the voltage generated at the third resistor 63 connected in series with the discharge lamp 90.

The igniter circuit 70 operates only when the lighting of the discharge lamp 90 starts. The igniter circuit 70 supplies a high voltage (higher voltage than in normal lighting of the discharge lamp 90) that is necessary for breaking insulation between the electrodes (between the first electrode 92 and the second electrode 93) of the discharge lamp 90 and thus forming a discharge path, between the electrodes (between the first electrode 92 and the second electrode 93) of the discharge lamp 90 when starting the lighting of the discharge lamp 90.

Figures 6A, 6B:
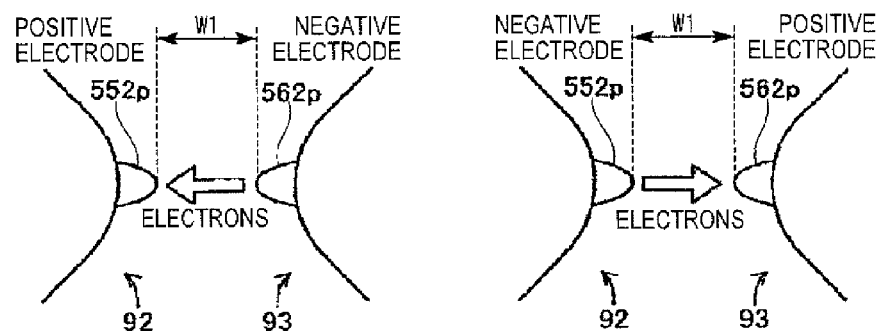
FIGS. 6A and 6B show the state of protrusions at the distal ends of the electrodes of the discharge lamp.

FIGS. 6A and 6B show the distal ends of the first electrode 92 and the second electrode 93. Protrusions 552p, 562p are formed at the distal ends of the first electrode 92 and the second electrode 93, respectively. Discharge occurring between the first electrode 92 and the second electrode 93 is mainly generated between the protrusion 552p and the protrusion 562p. In the case where there are protrusions 552p, 562p as in this embodiment, a shift of the discharge position (arc position) on the first electrode 92 and the second electrode 93 can be restrained, compared with the case with no protrusions.

FIG. 6A shows a first polarity state where the first electrode 92 operates as the positive electrode and the second electrode 93 operates as the negative electrode. In the first polarity state, discharge causes electrons to move from the second electrode 93 (negative electrode) to the first electrode 92 (positive electrode). Electrons are discharged from the negative electrode (second electrode 93). The electrons discharged from the negative electrode (second electrode 93) collide with the distal end of the positive electrode (first electrode 92). This collision generates heat, raising temperature at the distal end (protrusion 552*p*) of the positive electrode (first electrode 92).

FIG. 6B shows a second polarity state where the first electrode 92 operates as the negative electrode and the second electrode 93 operates as the positive electrode. In the second polarity state, contrary to the first polarity state, electrons move from the first electrode 92 to the second electrode 93. Consequently, temperature increases at the distal end (protrusion 562*p*) of the second electrode 93.

In this way, the temperature of the positive electrode, with which electrons collide, tends to be higher than the temperature of the negative electrode, which discharges electrons. Here, as the temperature of one electrode remains higher than the temperature of the other electrode for a long time, it may cause various inconveniences. For example, if the distal end of the high-temperature electrode is melted excessively, unintended deformation of the electrode can occur. Consequently, the distance between the electrodes (arc length) may become deviated from a proper value, causing unstable illuminance. Meanwhile, if the distal end of the low-temperature electrode is melted insufficiently, micro irregularities generated at the distal end may remain without melting. Consequently, a so-called arc jump may occur (the arc position may become unstable and move).

Figure 7:
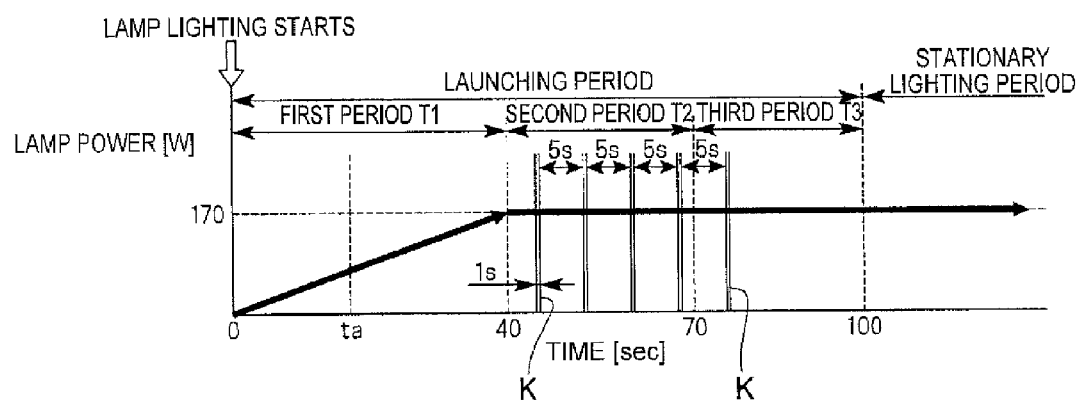
FIG. 7 shows an example of a drive power waveform of the discharge lamp.

In this embodiment, in order to melt the protrusions at the distal ends of the electrode properly, the control unit 40 controls the drive power supplied to the discharge lamp 90 as shown in FIG. 7.

FIG. 7 shows the waveform of the drive power in this embodiment. The horizontal axis in FIG. 7 represents time (seconds). The vertical axis in FIG. 7 represents drive power (W).

As the lighting of the discharge lamp 90 is started, drive power gradually increases and then reaches predetermined target power. Immediately after the lighting of the discharge lamp 90, the plasma density inside the discharge lamp 90 is small and the temperature is low. The drive power is unstable. After that, as the plasma density and temperature inside the discharge lamp 90 increase, the drive power becomes stable. The period until the drive power is stabilized from the start of the lighting of the discharge lamp 90 is defined as a launching period. During a period following the launching period, the discharge lamp 90 is lit continuously. This period is defined as a stationary lighting period.

In the drive power waveform in this embodiment, as shown in FIG. 7, the launching period is divided into three launching periods, that is, a first launching period T1, a second launching period T2, and a third launching period T3. As an example, if the launching period is 100 seconds, the first launching period T1 is set to 40 seconds, the second launching period T2 is set to 30 seconds, and the third launching period T3 is set to 30 seconds. Here, the launching period is divided into three. However, the number of divided periods is not limited to 3 and may be n (n being a natural number equal to or above 2). The duration of each of the divided launching periods is not particularly limited, either, and can be set as needed.

The first launching period T1 is a period in which the drive power linearly increases toward refresh power that is equal to or above low-power mode power and equal to or below rated power. Meanwhile, the second launching period T2 and the third launching period T3 are periods in which the drive power is maintained at the refresh power. However, from the second launching period into the third launching period T3, a high-load drive waveform pattern with a relatively high load on the discharge lamp 90, compared with a basic waveform pattern of the drive power in each of the second launching period T2 and the third launching period T3, is intermittently inserted. The high-load drive waveform pattern will be described in detail later. After the launching period ends, the stationary lighting period (low-power mode lighting period) in which the low-power mode power is supplied is provided.

The term "basic waveform pattern" in this embodiment corresponds to a "first waveform pattern" in the appended claims. The term "high-load drive waveform pattern" in this embodiment corresponds to a "second waveform pattern" in the appended claims.

As a specific example of the drive power, rated power Wt of the discharge lamp 90 is 200 W. Refresh power Wr is 170 W. Low-power mode power Wl is 170 W. That is, in this example, the refresh power Wr and the low-power mode power Wl are equal. In the first launching period T1 of 0 to 40 seconds, the drive power linearly increases from 0 V to 170 W. In the second launching period T2 of 40 to 70 seconds, the drive power is kept constant at 170 W. In the third launching period T3 of 70 to 100 seconds, the drive power is kept constant at 170 W. In the stationary lighting period after 100 seconds, the drive power is kept constant at 170 W.

If a drive power frequency in the first launching period T1 is $f_1$, a drive power frequency in the second launching period T2 is $f_2$, and a drive power frequency in the third launching period T3 is $f_3$, each drive power frequency is set in such a way as to satisfy the relation of $f_1 \geq f_2 \geq f_3$. As an example, the drive power frequency $f_1$ is set to 600 Hz, the drive power frequency $f_2$ is set to 400 Hz, and the drive power frequency $f_3$ is set to 400 Hz. That is, if a drive power frequency in an (x−1)th (x being a natural number equal to or above 2 and equal to or below n) is expressed as $f_{x-1}$ and a drive power frequency in an x-th launching period is expressed as $f_x$, the relation of $f_{x-1} \geq f_x$ is satisfied. The drive power frequency in the stationary lighting period may be arbitrary.

In other words, in the second launching period T2 and onward, the drive power frequency is maintained or the drive power frequency is gradually lowered, in contrast to the first launching period T1 immediately after the lighting of the discharge lamp 90. The reasons for this is that, in the case of driving in the low-power mode, the protrusions at the distal ends of the electrodes do not grow and remain narrower than in the case of driving with the rated power, and therefore driving with a high melting effect immediately after the lighting of the discharge lamp 90 may cause the narrow protrusions at the distal ends of the electrodes to collapse.

Thus, in the first launching period T1, as AC driving with a relatively high drive power frequency of 500 Hz or above is carried out, the protrusions can be melted gently while the shape of the protrusions is maintained. After that, in the second launching period T2 and onward, as the drive power frequency is maintained or gradually lowered, the protrusion melting effect is gradually enhanced and the protrusions are allowed to grow thick. Even in such a case, it is desirable that the drive power frequency is set so as not to melt the protrusions excessively.

In the above example, the drive power frequency $f_1$ is 600 Hz, the drive power frequency $f_2$ is 400 Hz, and the drive power frequency $f_3$ is 400 Hz. However, these drive power frequencies are not constantly fixed at these values. The control unit 40 shown in FIG. 4 detects the degree of deterioration of the discharge lamp 90 by referring to the lamp voltage (inter-electrode voltage), and properly adjusts the value of the drive power frequency in each of the first launching period, the second launching period and the third launching period, according to the degree of deterioration of the discharge lamp 90.

That is, as the deterioration (wear) of the discharge lamp 90 progresses, the distance between the electrodes increases and the lamp voltage increases according to the increase in the distance between the electrodes. In this case, a large reduction in the drive power frequency needs to be taken when shifting from the current launching period to the next launching period, so that the protrusions at the distal ends of the electrodes will melt more and grow. Therefore, the designer of the projector finds, in advance, a combination of a lamp voltage that is referred to and an optimum drive power frequency corresponding to the lamp voltage. An example of the combination of the lamp voltage and the drive power frequency is shown in Table 1. As can be seen from Table 1, the drive power frequency $f_3$ in the third launching period may be lower than the drive power frequency $f_2$ in the second launching period or may be the same as the drive power frequency $f_2$ in the second launching period.

TABLE 1

| Lamp Voltage that is Referred to | Period 1 [Hz] | Period 2 [Hz] | Period 3 [Hz] |
| --- | --- | --- | --- |
| 0 to 80 V | 800 | 600 | 600 |
| 81 to 100 V | 600 | 400 | 400 |
| 101 V and above | 600 | 400 | 200 |

Here, a first procedure from referring the lamp voltage (inter-electrode voltage) to determining the drive power frequency in each launching period will be described with reference to FIG. 11.

After the discharge lamp 90 is lit (Step S1 in FIG. 11), a time until the lamp voltage in the first launching period T1 is referred to (equivalent to ta in FIG. 7) is set in advance. The time ta is set, for example, to 20 seconds. The control unit 40 determines whether the time ta (20 seconds) has passed from the start of the lighting of the discharge lamp 90 or not (Step S2 in FIG. 11).

Figure 11:
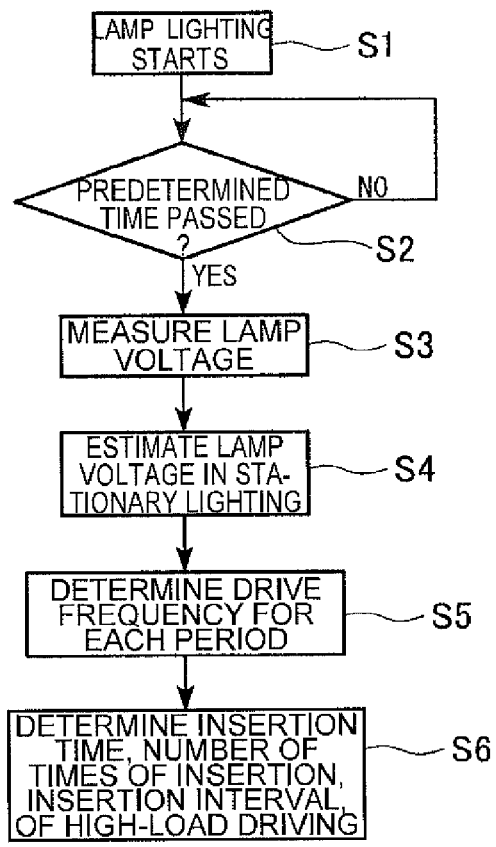
FIG. 11 is a flowchart for determining a drive power waveform.

If the time ta (20 seconds) has passed, the control unit 40 refers to the lamp voltage (Step S3 in FIG. 11). In the first launching period T1, the lamp voltage gradually increases with an increase in the drive power. Therefore, the lamp voltage that is referred to at the time ta is different from the lamp voltage in the stationary lighting period. Thus, the designer of the projector prepares, in advance, a conversion formula for finding the lamp voltage in the stationary lighting period from the lamp voltage value at the time ta, or a conversion table based on statistical values of voltage transition that is actually measured with plural discharge lamps. An example of the conversion table is shown in Table 2. Table 2 also shows an insertion pattern of high-load driving of Table 3, described later.

TABLE 2

| Lamp Voltage that is Referred to | Insertion Time [sec] | Number of Times of Insertion [times] | Insertion Interval [sec] | Pattern |
| --- | --- | --- | --- | --- |
| 0 to 60 V | 0 | 0 | — | A |
| 61 to 70 V | 1 | 1 | — | B |
| 71 to 80 V | 1 | 2 | 5 | C |
| 81 to 90 V | 1 | 5 | 5 | D |
| 91 V and above | 2 | 5 | 8 | E |

The control unit 40 estimates the lamp voltage in the stationary lighting period, based on Table 2 (Step S4 in FIG. 11), and determines the drive power frequency in each launching period, based on Table 1 (Step S5 in FIG. 11). For example, if the lamp voltage that is referred to at the time to is 30 V, the estimate value of the lamp voltage in the stationary lighting period is 81 to 90 V from Table 2. As the estimate value of the lamp voltage in the stationary lighting period is 81 to 90 V, the drive power frequency in each launching period is found as follows, from Table 1. That is, the drive power frequency $f_1$ is 600 Hz, the drive power frequency $f_2$ is 400 Hz, and the drive power frequency $f_3$ is 400 Hz.

Meanwhile, as described above, it is desirable that the protrusions are melted gently in the first launching period T1 and that the protrusion melting effect is properly enhanced to promote the growth of the protrusions in the second launching period T2 and onward. To realize this, in the second launching period T2 and onward, the high-load drive waveform pattern which provides a higher load to the electrodes of the discharge lamp 90 than the basic waveform pattern is inserted, in addition to lowering the drive power frequency by each launching period or maintaining the drive power frequency, as the basic waveform pattern.

The high-load drive waveform pattern is made up of, for example, an AC drive waveform pattern with a drive power frequency of 500 Hz or below, or a drive waveform pattern combining DC driving and AC driving. In this embodiment, a drive waveform pattern including DC driving and AC driving is employed as an example.

Figure 10:
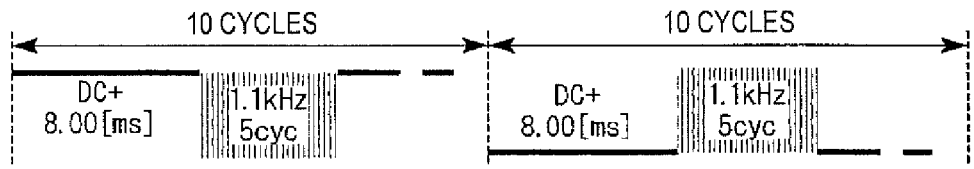
FIG. 10 shows an example of the high-load drive waveform pattern.

FIG. 10 shows an example of the high-load drive waveform pattern.

In this embodiment, a unit pattern made up of DC driving with one polarity for 8 milliseconds followed by 5 cycles of AC waveform with a drive power frequency of 1.1 kHz is repeated for 10 cycles, and then the polarity of DC driving is inverted and a pattern repeating the similar driving is employed, as shown in FIG. 10. In this example, DC driving with the same polarity is inserted repeatedly for 10 cycles, thereby promoting the melting of the protrusion on one electrode. Although the DC driving time is not particular limited, it is preferable that the DC driving time is longer than the AC driving time between rounds of DC driving, in order to enhance the protrusion melting effect. Also, in order to melt the protrusions on the two electrodes equally, it is preferable that the DC driving time with one polarity and the DC driving time with the other polarity are equal, when the insertion period of the high-load drive waveform pattern is viewed as a whole.

Figure 8:
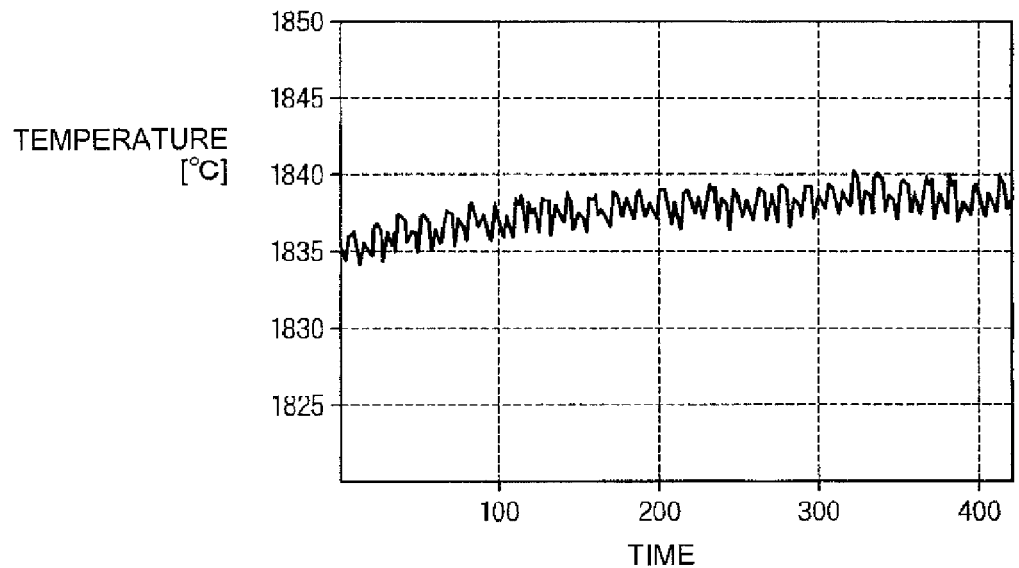
FIG. 8 is a graph showing change in temperature of the electrodes when driving with a basic waveform pattern is carried out.

FIG. 8 shows change in temperature of the electrodes when the discharge lamp 90 is driven with the drive power frequency of 400 Hz, which is the basic waveform pattern in the second launching period T2.

Figure 9:
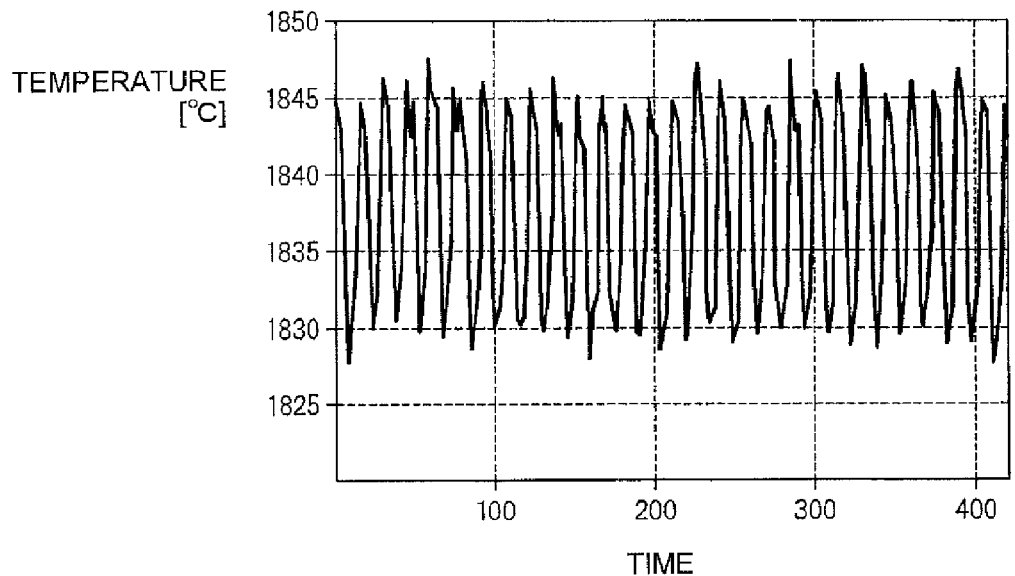
FIG. 9 is a graph showing change in temperature of the electrodes when driving with a high-load drive waveform pattern inserted in the basic waveform pattern is carried out.

FIG. 9 shows change in temperature of the electrodes when the discharge lamp 90 is driven with a drive power waveform in which the high-load drive waveform pattern shown in FIG. 10 is inserted in the basic waveform pattern in the second launching period T2.

In FIGS. 8 and 9, the horizontal axis represents time [relative value], and the vertical axis represents temperature [° C.].

As clear from FIGS. 8 and 9, when the high-load drive waveform pattern is inserted, the range of temperature change in the electrodes is greater than in the case where the high-load drive waveform pattern is not inserted. The greater range of temperature change in the electrodes is, in other words, the high-load on the electrodes, which means that the protrusion melting effect is high. That is, the driving with a high load on the electrodes as shown in FIG. 9 has the effect of promoting the melting of the protrusions and allowing the deformed or worn protrusions to regrow. Meanwhile, the driving with the basic waveform pattern as shown in FIG. 8 has the effect of stabilizing the shape of the melted protrusions and allowing the protrusions to grow gently. As the driving with a high load on the electrodes and with a high protrusion melting effect is intermittently inserted in the basic driving with a low load on the electrodes to allow the protrusions to grow gently, the growth of thick protrusions that cannot easily melt in the low-power mode is promoted.

In this embodiment, the control unit 40 detects the degree of deterioration of the discharge lamp 90 by referring to the lamp voltage (inter-electrode voltage) and properly adjusts the degree of insertion of the high-load drive waveform pattern according to the degree of deterioration of the discharge lamp 90 (Step S6 in FIG. 11). Specifically, the control unit 40 properly adjusts a combination of the insertion time, the insertion interval and the number of times of insertion of the high-load drive waveform pattern, according to the degree of deterioration of the discharge lamp 90. The designer of the projector finds, in advance, a combination of a lamp voltage in the stationary lighting period and an optimum insertion time, insertion interval and number of times of insertion of the high-load drive waveform pattern corresponding to the lamp voltage. An example of the combination of the lamp voltage, and the insertion time, the insertion interval and the number of times of insertion of the high-load drive waveform pattern, is shown in Table 3.

TABLE 3

| Lamp Voltage at Time ta | Expected Value of Lamp Voltage in Stationary Lighting Period | Pattern |
| --- | --- | --- |
| Up to 21 V | 0 to 60 V | A |
| 22 to 24 V | 61 to 70 V | B |
| 25 to 28 V | 71 to 80 V | C |
| 29 to 32 V | 81 to 90 V | D |
| 33 V and above | 91 V and above | E |

For example, if the lamp voltage that is referred to at the time to in the first launching period is 30 V, the estimate value of the lamp voltage in the stationary lighting period is 81 to 90 V from Table 2. As the estimate value of the lamp voltage in the stationary lighting period is 81 to 90 V, the insertion pattern of the high-load driving to be employed is a pattern D. From Table 3, in the case of the pattern D, the insertion time of the high-load drive waveform pattern is 1 second, the number of times of insertion is 5 times, and the insertion interval is 5 seconds. A high-load drive waveform pattern K is inserted, as shown in FIG. 7.

In this embodiment, an example of adjusting the three parameters, that is, the insertion time, the insertion interval and the number of times of insertion of the high-load drive waveform pattern, according to the degree of deterioration of the discharge lamp 90 is described. However, the configuration of the high-load drive waveform pattern itself may be adjusted in addition to the three parameters. That is, plural types of high-load drive waveform patterns may be prepared other than the high-load drive waveform pattern shown in FIG. 10 and an optimum pattern may be selected from the plural types according to the degree of deterioration of the discharge lamp 90. Moreover, there is no need to change all the four parameters. One of the parameters may be fixed and the other parameters may be changed.

As described above, in the discharge lamp lighting device 10 of this embodiment, as the launching period of the discharge lamp 90 progresses from the first launching period T1 to the second launching period T2 and the third launching period T3, the drive power frequency gradually falls and the high-load drive waveform pattern is inserted in the second launching period T2 and onward. Also, the control unit 40 adjusts both the drive power frequency in each launching period and the degree of insertion of the high-load drive waveform pattern according to the degree of deterioration of the discharge lamp 90. Therefore, regardless of the degree of deterioration of the discharge lamp 90, the protrusions at the distal ends of the electrodes can be melted constantly properly and the good shape of the protrusions can be maintained. Consequently, the light source 200 which has less change in illuminance and a long service life due to stable discharge can be realized. Thus, the projector 500 with excellent display definition and high reliability can be realized.

In this embodiment, the control unit 40 is configured to refer to the lamp voltage at an arbitrary time to in the first launching period T1 and estimate the lamp voltage in the stationary lighting period on the basis of the result of the reference to the lamp voltage. According to this configuration, since the lamp voltage in the first launching period T1 is referred to every time the lamp is lit, the lamp voltage in the stationary lighting period can be accurately estimated and the degree of deterioration of the discharge lamp 90 can be detected appropriately.

However, as the procedure from the reference to the lamp voltage to the determination on the drive power frequency and the degree of insertion of the high-load drive waveform pattern, the following second procedure may be employed instead of the above first procedure. In the second procedure, the control unit 40 stores the lamp voltage that is referred to at the time of previous lighting of the discharge lamp, for example, in the storage unit 44. After that, at the time of next lighting of the discharge lamp, the control unit 40 reads out the lamp voltage from the f d s f storage unit 44 and estimates the lamp voltage in the stationary lighting period on the basis of the result of the reading.

In the case where the second procedure is employed, the inter-electrode voltage that is already stored at the time of previous lighting is referred to at the time of next lighting. Therefore, the lamp voltage in the stationary lighting period can be easily estimated without referring to the lamp voltage in the launching period, and the degree of deterioration of the discharge lamp 90 can be detected appropriately.

The technical scope of the invention is not limited to the above embodiment. Various changes can be made without departing from the spirit and scope of the invention.

For example, in the embodiment, an example where the refresh power Wr is equal to the low-power mode power Wl is described. However, instead of this configuration, the refresh power Wr may be higher than the low-power mode power Wl and lower than the rated power Wt. Alternatively, the refresh power Wr may be equal to the rated power Wt. That is, it suffices that the refresh power Wr is equal to or above the low-power mode power Wl and equal to or below the rated power Wt (Wl≤Wr≤Wt).

In the embodiment, the degree of deterioration of the discharge lamp is detected by referring to the lamp voltage. However, instead of this configuration, the degree of deterioration of the discharge lamp may be detected, for example, by referring to the cumulative lighting duration of the discharge lamp without referring to the lamp voltage. In this case, a table showing the relation between the cumulative lighting duration of the discharge lamp and the drive power frequency, a table showing the relation between the cumulative lighting duration of the discharge lamp and the insertion pattern of the high-load driving or the like may be prepared. Also, the high-load drive waveform pattern may not necessarily be inserted. Moreover, the specific configurations of the discharge lamp driving device, the light source and the projector are not limited to the examples in the embodiment, and changes can be made as needed.

The entire disclosure of Japanese Patent Application No. 2013-213473, filed Oct. 11, 2013 is expressly incorporated by reference herein.

What is claimed is:

1. A discharge lamp driving device comprising:
    a discharge lamp driving unit configured to supply drive power to a discharge lamp; and
    a control unit configured to control the discharge lamp driving unit;
    wherein the control unit is configured to provide a launching period from a start of lighting of the discharge lamp to a predetermined time and a stationary lighting period provided after the launching period, the stationary lighting period in which a first drive power is supplied to the discharge lamp,
    the launching period include a first launching period in which the drive power supplied to the discharge lamp increases toward a second drive power larger than the first drive power and a second launching period in which the second drive power is supplied to the discharge lamp,
    a drive frequency of drive current supplied to the discharge lamp in the second launching period is lower than a drive frequency of the drive current supplied to the discharge lamp in the first launching period,
    the control unit is configured to perform a mode in which a drive power lower than a rated power of the discharge lamp is supplied to the discharge lamp in the stationary lighting period, and
    the first drive power is the drive power in the mode.

2. The discharge lamp driving device according to claim 1, wherein the control unit configured to detect a degree of deterioration of the discharge lamp by referring to an inter-electrode voltage of the discharge lamp in the stationary lighting period.

3. The discharge lamp driving device according to claim 2, wherein the control unit is configured to refer to the inter-electrode voltage in the first launching period and estimate the inter-electrode voltage in the stationary lighting period on the basis the referred to inter-electrode voltage.

4. A projector comprising:
    a discharge lamp configured to emit light;
    the discharge lamp driving device according to claim 3;
    a light modulation element configured to modulate light emitted from the discharge lamp, according to a video signal; and
    a projection system configured to project the light modulated by the light modulation element.

5. The discharge lamp driving device according to claim 2, wherein the control unit is configured to read out the inter-electrode voltage referred to and stored at the time of previous lighting of the discharge lamp, at the time of next lighting of the discharge lamp, and estimate the inter-electrode voltage in the stationary lighting period on the basis of the read out inter-electrode voltage.

6. A projector comprising:
    a discharge lamp configured to emit light;
    the discharge lamp driving device according to claim 5;
    a light modulation element configured to modulate light emitted from the discharge lamp, according to a video signal; and
    a projection system configured to project the light modulated by the light modulation element.

7. A projector comprising:
    a discharge lamp configured to emit light;
    the discharge lamp driving device according to claim 2;
    a light modulation element configured to modulate light emitted from the discharge lamp, according to a video signal; and
    a projection system configured to project the light modulated by the light modulation element.

8. The discharge lamp driving device according to claim 1, wherein the drive frequency in the first launching period is equal to or higher than 500 Hz.

9. A projector comprising:
    a discharge lamp configured to emit light;
    the discharge lamp driving device according to claim 8;
    a light modulation element configured to modulate light emitted from the discharge lamp, according to a video signal; and
    a projection system configured to project the light modulated by the light modulation element.

10. A projector comprising:
    a discharge lamp configured to emit light;
    the discharge lamp driving device according to claim 1;
    a light modulation element configured to modulate light emitted from the discharge lamp, according to a video signal; and
    a projection system configured to project the light modulated by the light modulation element.

11. A discharge lamp driving device comprising:
    a discharge lamp driving unit configured to supply drive power to a discharge lamp; and
    a control unit configured to control the discharge lamp driving unit;
    wherein the control unit is configured to provide a launching period from a start of lighting of the discharge lamp to a predetermined time and a stationary lighting period provided after the launching period, the stationary lighting period in which a first drive power is supplied to the discharge lamp,
    the launching period include a first launching period in which the drive power supplied to the discharge lamp increases toward a second drive power larger than the first drive power and a second launching period in which the second drive power is supplied to the discharge lamp,
    a drive frequency of drive current supplied to the discharge lamp in the second launching period is lower than a drive frequency of the drive current supplied to the discharge lamp in the first launching period, and the drive current supplied in the second launching period intermittently includes a second waveform pattern having a higher load provided to electrodes of the discharge lamp than a load in a first waveform pattern that is a basic waveform pattern of the drive current supplied to the discharge lamp in the launching period.

12. The discharge lamp driving device according to claim 11, wherein the control unit configured to adjust at least one of an insertion time of the second waveform pattern, an insertion interval of the second waveform pattern, a number of times of insertion of the second waveform pattern, and a configuration of the second waveform pattern, according to a degree of deterioration of the discharge lamp.

13. A projector comprising:
    a discharge lamp configured to emit light;
    the discharge lamp driving device according to claim 12;

a light modulation element configured to modulate light emitted from the discharge lamp, according to a video signal; and a projection system configured to project the light modulated by the light modulation element.

14. The discharge lamp driving device according to claim 11, wherein the second waveform pattern includes one of a drive current pattern having a drive frequency equal to or lower than 500 Hz and a drive current pattern combining DC driving and AC driving.

15. A projector comprising:
a discharge lamp configured to emit light;
the discharge lamp driving device according to claim 14;
a light modulation element configured to modulate light emitted from the discharge lamp, according to a video signal; and
a projection system configured to project the light modulated by the light modulation element.

16. A projector comprising:
a discharge lamp configured to emit light;
the discharge lamp driving device according to claim 11;
a light modulation element configured to modulate light emitted from the discharge lamp, according to a video signal; and
a projection system configured to project the light modulated by the light modulation element.

17. A discharge lamp driving method for supplying a drive power to a discharge lamp and driving the discharge lamp, the method comprising:

supplying the discharge lamp with the drive power including a launching period from a start of lighting of the discharge lamp to a predetermined time and a stationary lighting period provided after the launching period, the stationary lighting period in which a first drive power is supplied to the discharge lamp; and performing a mode in which a drive power lower than a rated power of the discharge lamp is supplied to the discharge lamp in the stationary lighting period, wherein the launching period include a first launching period in which the drive power supplied to the discharge lamp increases toward a second drive power larger than the first drive power and a second launching period in which the second drive power is supplied to the discharge lamp, a drive frequency of drive current supplied to the discharge lamp in the second launching period is lower than a drive frequency of the drive current supplied to the discharge lamp in the first launching period, and the first drive power is the drive power in the mode.

* * * * *